(12) United States Patent
Ezick et al.

(10) Patent No.: US 8,892,483 B1
(45) Date of Patent: Nov. 18, 2014

(54) SYSTEMS AND METHODS FOR PLANNING A SOLUTION TO A DYNAMICALLY CHANGING PROBLEM

(75) Inventors: James Ezick, Canonsburg, PA (US); Richard A. Lethin, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 495 days.

(21) Appl. No.: 13/149,517

(22) Filed: May 31, 2011

Related U.S. Application Data

(60) Provisional application No. 61/350,443, filed on Jun. 1, 2010.

(51) Int. Cl.
  *G06F 15/18* (2006.01)
(52) U.S. Cl.
  USPC .......................................................... 706/14
(58) Field of Classification Search
  None
  See application file for complete search history.

(56) References Cited

U.S. PATENT DOCUMENTS

| | | |
|---|---|---|
| 5,442,699 A | 8/1995 | Arnold et al. |
| 5,442,797 A | 8/1995 | Casavant et al. |
| 5,613,136 A | 3/1997 | Casavant et al. |
| 5,742,814 A | 4/1998 | Balasa et al. |
| 5,920,854 A | 7/1999 | Kirsch et al. |
| 5,953,531 A | 9/1999 | Megiddo et al. |
| 6,006,033 A | 12/1999 | Heisch |
| 6,018,735 A | 1/2000 | Hunter |
| 6,038,398 A | 3/2000 | Schooler |
| 6,131,092 A | 10/2000 | Masand |
| 6,279,113 B1 | 8/2001 | Vaidya |
| 6,327,699 B1 | 12/2001 | Larus et al. |
| 6,338,057 B1 | 1/2002 | Weeks |
| 6,651,246 B1 | 11/2003 | Archambault et al. |
| 6,754,650 B2 | 6/2004 | Cho et al. |
| 6,772,415 B1 | 8/2004 | Danckaert et al. |
| 6,785,677 B1 | 8/2004 | Fritchman |
| 6,792,546 B1 | 9/2004 | Shanklin et al. |
| 6,880,087 B1 | 4/2005 | Carter |
| 6,912,526 B2 | 6/2005 | Akaboshi |
| 6,952,694 B2 | 10/2005 | Mathur et al. |
| 6,952,821 B2 | 10/2005 | Schreiber |
| 7,086,038 B2 | 8/2006 | Cronquist et al. |
| 7,185,327 B2 | 2/2007 | Scales |
| 7,225,188 B1 | 5/2007 | Gai et al. |
| 7,260,558 B1 | 8/2007 | Cheng et al. |
| 7,594,260 B2 | 9/2009 | Porras et al. |
| 7,634,566 B2 | 12/2009 | Turner et al. |
| 7,757,222 B2 | 7/2010 | Liao et al. |
| 8,087,010 B2 | 12/2011 | Eichenberger et al. |
| 8,108,845 B2 | 1/2012 | Little et al. |
| 8,230,408 B2 | 7/2012 | Eng |

(Continued)

OTHER PUBLICATIONS

Nieuwenhuis, Oliveras, "Solving SAT and SAT Modulo Theories: From an Abstract Davis-Putnam-Logemann-Loveland Procedure to DPLL(T)", Journal of the ACM (JACM) JACM vol. 53 Issue 6, Nov. 2006, pp. 937-977.*

(Continued)

*Primary Examiner* — Kakali Chaki
*Assistant Examiner* — Walter Hanchak
(74) *Attorney, Agent, or Firm* — Goodwin Procter LLP

(57) ABSTRACT

A plan representing a final solution to a problem is obtained efficiently, if the problem changes while being solved, by identifying the solution elements not affected by the change, and by reusing those solution elements.

48 Claims, 4 Drawing Sheets

(56) References Cited

U.S. PATENT DOCUMENTS

| | | | |
|---|---|---|---|
| 8,250,550 | B2 | 8/2012 | Luszczek et al. |
| 8,255,890 | B2 | 8/2012 | Luszczek et al. |
| 8,307,347 | B2 | 11/2012 | Austin et al. |
| 2002/0021838 | A1 | 2/2002 | Richardson et al. |
| 2003/0097652 | A1 | 5/2003 | Roediger et al. |
| 2004/0034754 | A1 | 2/2004 | Schreiber |
| 2004/0068501 | A1 | 4/2004 | McGoveran |
| 2005/0114700 | A1 | 5/2005 | Barrie et al. |
| 2006/0048121 | A1 | 3/2006 | Blainey et al. |
| 2006/0048123 | A1 | 3/2006 | Martin |
| 2006/0085858 | A1 | 4/2006 | Noel et al. |
| 2007/0033367 | A1 | 2/2007 | Sakarda et al. |
| 2007/0074195 | A1 | 3/2007 | Liao et al. |
| 2007/0192861 | A1 | 8/2007 | Varghese et al. |
| 2008/0010680 | A1 | 1/2008 | Cao et al. |
| 2009/0037889 | A1 | 2/2009 | Li et al. |
| 2009/0083724 | A1 | 3/2009 | Eichenberger et al. |
| 2009/0119677 | A1 | 5/2009 | Stefansson et al. |
| 2009/0259997 | A1 | 10/2009 | Grover et al. |
| 2009/0307673 | A1 | 12/2009 | Eichenberger et al. |
| 2010/0050164 | A1 | 2/2010 | Van De Waerdt et al. |
| 2010/0162225 | A1 | 6/2010 | Huang et al. |

OTHER PUBLICATIONS

Aloul, Ramani, Sakallah, Markov, "Solution and Optimization of Systems of Pseudo-Boolean Consraints", IEEE Transactions on Computers, vol. 56, No. 10, Oct. 2007, pp. 1415-1424.*
Franzie, Herde, Telge, Ratschan, Schubert, "Effcient Solving of Large Non-linear Arithmetic Constraint Systems with Complex Boolean Structure", JSAT, Journal on Satisfiability, Boolean Modelling and Computation, vol. 1(3-4): 2007, pp. 209-236.*
Zhang, "Searching for Truth: Techniques for Satisfiability of Boolean Formulas", phD Thesis, Princeton University, 2003, pp. 1-197.*
Ahmed et al, Synthesizing Transformations for Locality Enhancement of Imperfectly-nested Loops Nests, ACM ICS 2000, pp. 141-152.
Ahmed et al, Tiling Imperfectly-nested Loop Nests, IEEE 2000, 14 pgs.
Aho et al, Compilers: Principles, Techniques, & Tools, 2nd Edition, 2006, pp. 173-186.
Aho et al, Efficient String Matching: An Aid to Bibliographic Search, Communications of the ACM, vol. 18, No. 6, Jun. 1975, pp. 333-340.
Aigner et al, an Overview of the SUIF2 Compiler Infrastructure, Computer Systems Laboratory, Standford University, 1999, pp. 1-14.
Aldwairi et al, Configurable String Matching Hardware for Speeding Up Intrusion Detection, ACM SIGARCH Computer Architecture News, Vo. 33, No. 1, Mar. 2005, pp. 99-107.
Allen et al, Conversion of Control Dependence to Data Dependence, ACM 1983, pp. 177-189.
Ancourt et al, Scanning Polyhedra with DO Loops, Proceedings of the third ACM SIGPLAN symposium on Principles and practice of parallel programming, Apr. 21-24, 12 pgs. 1991.
Appel, A.W., Deobfuscation is in NP, Princeton University, Aug. 21, 2002, 2 pgs.
Ayers et al, Aggressive Inlining, PLDI '92 Las Vegas, NV, USA.
Ball et al, Branch Prediction for Free, Technical Report #1137, University of Wisconsin, 1993, 29 pgs.
Barak et al, On the (Im)possibility of Obfuscating Programs, Advances in Cryptology, CRYPTO 2001, vol. 2139, pp. 1-18.
Barthou et al, Maximal Static Expansion, International Journal of Parallel Programming, vol. 28, No. 3, 2000, 20 pgs.
Bastoul et al, Putting Polyhedral Loop Transformations to Work, INRIA, No. 4902, Jul. 2003.
Bastoul, C., Generating Loops for Scanning Polyhedra: CLooG User's Guide, First Version, Rev. 1.6, Apr. 8, 2004, pp. 1-30.
Bastoul, Code Generation in the Polyhedral Model is Easier Than You Think, Proceedings of the 13th International Conference on Parallel Architecture and Compilation Techniques, 2004.
Bastoul, Efficient Code Generation for Automatic Parallelization and Optimization, Proceedings of the Second International Symposium on Parallel and Distributed Computing, 2003.
Bednara et al, Synthesis for FPGA Implementations From Loop Algorithms, In Proceedings ofthe Int. Conf. on Engineering of Reconfigurable Systems and Algorithms (ERSA), Jun. 2001.
Berkelaar et al, The IpSolve Package, Sep. 21, 2007, pp. 1-9.
Bik et al, Implementation of Fourier-Motzkin Elimination, Technical Report 94-42, Department. of Computer Science, Leiden University, 1994.
Bondhugula et al, A Practical and Fully Automatic Polyhedral Program Optimization System,OSU OSU-CISRC-10/07-TR70; Dec. 14, 2007.
Bondhugula et al, A Practical Automatic Polyhedral Parallelizer and Locality Optimizer, PDLI '08, Jun. 7-13, 2008.
Bondhugula et al, Affine Transformations for Communication Minimal Parallelization and Locality Optimization of Arbitrarily Nested Loop Sequences, OSU CSE Technical Report, OSU-CISRC-5/07/TR43, pp. 1-30.
Bondhugula et al, Automatic Mapping of Nested Loops to FPGAs, OSU, Mar. 19, 2007.
Bondhugula et al, Toward Effective Automatic Parallelization for Multiscore Systems, In proceeding of 22nd IEEE International Symposium on Parallell and Distributed Processing, (IPDPS 2008). Miami, Florida USA, Apr. 14, 2008.
Boulet et al, (Pen)-ultimate tiling?, Laboratoire de l'Informatique du Parallelisme, Research Report No. 93-96, Nov. 1993, pp. 1-17.
Boulet et al, Scanning polyhedra without Do-loops, Parallel Architectures and Compilation Techniques, 1998, Proceedings 1998 International Conference on Oct. 12-18, 1998, pp. 4-11.
Briggs et al, Effective Partial Redundancy Elimination, Sigplan PLDI, Jun. 1994, pp. 1-12.
Brumley et al, Towards Automatic Generation of Vulnerability-Based Signatures, Proceedings of the 2006 IEEE Symposium on Security and Privacy, pp. 1-15.
Burger et al, Scaling to the End of the Silicon with Edge Architectures, Computer, Jul. 2004, pp. 44-55.
Burke et al, Flow-Insensitive Interprocedural Alias Analysis in the Presence of Pointers, Lecture Notes in Computer Science, Proceedings from the 7th International Workshop on Languages and Compilers for Parallel Computing, vol. 892, 1995, 18 pgs.
Cifuentes, C., A Structuring Algorithm for Decompilation, XIX Conferencia Latinoamericana de Inforamatica, Buenos Aires, Argentina, Aug. 2-6, 1993, pp. 267-276.
Cifuentes, Structuring Decompiled Graphs, Department of Computer Science, University of Tasmania, 1994, 15 pgs.
Clauss et al, Automatic Memory Layout Transformations to Optimize Spatial Locality in Parameterized Loop Nests, ACM SIGARCH Computer Architecture News, vol. 28, No. 1, 2000, pp. 1-9.
Clauss et al, Deriving Formulae to Count Solutions to Parameterized Linear Systems using Ehrhart Polynomials: Applications to the Analysis of Nested-Loop Programs, Apr. 10, 1997.
Clearspeed—Accelerator Technology Primer, ClearSpeed Technology Primer, ClearSpeed Technology, Inc., 2006.
Clearspeed—ClearSpeed Programming Model: An introduction, ClearSpeed Technology Inc. 2007.
ClearSpeed—ClearSpeed Programming Model: Card-side Libraries, ClearSpeed Technology Inc. 2007.
ClearSpeed—ClearSpeed Programming Model: Optimizing Performance, ClearSpeed Technology Inc. 2007.
ClearSpeed—CSX Processor Architecture Whitepaper, ClearSpeed Technology Plc., 2006.
ClearSpeed—Introduction to ClearSpeed Acceleration, ClearSpeed Technology Inc., 2007, 27 pages.
ClearSpeed—Introduction to ClearSpeed Acceleration, Powerpoint presentation, ClearSpeed Technology Plc, 2007, 133 pgs.
ClearSpeed—Overview of Architecture: System Level (host) Architecture and ClearSpeed Architecture, ClearSpeed Technology Inc., 2007.
ClearSpeed Introductory Programming Manual—The ClearSpeed Software Development Kit, ClearSpeed Technology Inc. 2007.
ClearSpeed Programming Model: Case Study, ClearSpeed Technology Inc., 2007.

(56) References Cited

OTHER PUBLICATIONS

ClearSpeed Technical Training: Software Development, ClearSpeed Technology Inc., 2007.
Click et al, A Simple Graph-Based Intermediate Representation, ACM IR'95, 1995, pp. 35-49.
Click, C., Global Code Motion Global Value Numbering, ACM SIGPLAN' 95, pp. 246-257, 1995.
Collard et al, Automatic Generation of Data Parallel Code, Proceedings of the Fourth International Workshop on Compilers for Parallel Computers, Dec. 1993.
Collard et al, Fuzzy Array Dataflow Analysis, ACM Principles and Practice of Parallel Programming, PPOpp'95, Jul. 1995, 10 pgs.
Collberg et al, A Taxonomy of Obfuscating Transformations, Technical Report 148, Department of Computer Science, University of Auckland, Jul. 1997. http://www.cs.auckland.ac.nz/-Ccollberg/Research/Publications/CollbergThomborsonLow97a.
Collberg et al, Manufacturing Cheap, Resilient, and Stealthy Opaque Constructs, POPL 98, San Diego, CA 1998.
Cooper et al, Operator Strength Reduction, ACM Transactions on Programming Languages and Systems, vol. 23, No. 5, pp. 603-625, Sep. 2001.
Cooper et al, SCC-Based Value Numbering, CRPC-TR95636-S, Oct. 1995, pp. 1-12.
Cousot et al, Abstract Interpretation: A Unified Lattice Model for Static Analysis of Programs by Construction or Approximation of Fixpoints, Conference Record of the Fourth ACM Symposium on Principles of Programming Languages, Jan. 17-19, 1977, 16 pgs.
Cytron et al, Efficiently Computing Static Single Assignment Form and the Control Dependence Graph, Mar. 7, 1991, pp. 1-52.
Darte et al, Algorithm, Chapter 5: Parallelism Detection in Nested Loops, pp. 193-226.
Darte et al, Automatic parallelization based on multi-dimensional scheduling, Research Report No. 94-24, Laboratoire de l'Informatique de Parallelisme, 1994, pp. 1-34.
Darte et al, Lattice-Based Memory Allocation, ACM CASES'03, pp. 298-308, 2003.
Darte et al, Lattice-Based Memory Allocation, IEEE Transactions on Computers, vol. 54, No. 10, Oct. 2005, pp. 1242-1257.
Darte et al, Lattice-Based Memory Allocation, Research Report No. 2004-23, Apr. 2004, 1-43.
Darte et al, Revisiting the decomposition of Karp, Miller and Winograd, Parallel Processing Letters, 1995.
Ezick et al, Alef: A SAT Solver for MPI-Connected Clusters, Technical Report, Aug. 13, 2008, 21 pgs.
Featurier, Some efficient solutions to the affine scheduling problem Part I One-dimensional Time, Laboratoire MASI, Institute Blaise Pascal, Universite de Versailles St-Quentin, Apr. 23, 1993.
Feautrier et al, Solving Systems of Affine (In)Equalities: PIP's User's Guide, 4th Version, rev. 1.4, Oct. 18, 2003, pp. 1-25.
Feautrier, P., Array Expansion, Universite de Versailles St-Quentin, Jul. 1988, pp. 1-20.
Feautrier, P., Dataflow Analysis of Array and Scalar References, Int. J. of Parallel Programming, vol. 20, No. 1, 1991, pp. 1-37.
Feautrier, P., Parametric Integer Programming, RAIRO Operationnelle, vol. 22, Sep. 1988, pp. 1-25.
Feautrier, P., Some efficient solutions to the affine scheduling problem, Part II, Multidimensional Time, IBP/MSAI, No. 92.78, 1992, pp. 1-28.
Ferrante et al, The Program Dependence Graph and Its Use in Optimization, ACM Transactions on Programming Languages and Systems, vol. 9, No. 3, Jul. 1987, pp. 319-349.
Franke et al, Compiler Transformation of Pointers to Explicit Array Accesses in DSP Applications, Institute for Computing Systems Architecture (ICSA), University of Edinburgh.
Gautam et al, The Z-Polyhedral Model, SIGPLAN Symp. on Principles and Practice of Parallel Programming, pp. 237-248, New York, NY, USA, 2007.
George et al, Iterated Register Coalescing, ACM Transactions on Programming Languages and Systems, vol. 18, No. 3, May 1996, pp. 300-324.
Ghosh et al, Cache Miss Equations: A Compiler Framework for Analyzing and Tuning Memory Behavior, ACM Transactions on Programming Languages and Systems, vol. 21, No. 4, Jul. 1999, pp. 702-745.
Griebl et al, Code Generation in the Polytope Model, pact, pp. 106, Seventh International Conference on Parallel Architectures and Compilation Techniques (PACT'98), 1998.
Griebl et al, Forward Communication Only Placements and their Use for Parallel Program Construction, University of Passau.
Griebl et al, Space-Time Mapping and Tiling: A Helpful Combination, Concurrency and Comput.: Pract. Exper. 2004, 16:221-246.
Griebl, Automatic Parallelization of Loop Programs for Distributed Memory Architectures, Fakultat fur Mathematik und Informatik, Jun. 2, 2004.
Griebl, On the Mechanical Tiling of Space-Time Mapped Loop Nests, Fakultat fur Mthemetik und Informatik, Universitat Passau, Germany.
Gu et al, Symbolic Array Dataflow Analysis for Array Privatization and Program Parallelization, Proceedings of Supercomputing '95, pp. 1-19, 1995.
Gustafson et al, ClearSpeed—Whitepaper: Accelerating the Intel® Math Kernel Library, ClearSpeed Technology Inc., 2006.
Heintze et al, Ultra-fast Aliasing Analysis Using CLA: A Million Lines of C Code in a Second, ACM SIGPLAN Notices, vol. 36, No. 5, 2001, 10 pgs.
Intel® QuickAssist Technology Accelerator Abstraction Layer (AAL), White Paper, Intel® Corporation, 2007, 8 pgs.
International Report on Patentability dated Mar. 31, 2011 for PCT Application No. PCT/US2009/057194.
International Search Report and the Written Opinion dated Mar. 18, 2010 for PCT Application No. PCT/US2009/057194.
International Search Report and the Written Opinion dated Nov. 26, 2010 for PCT Application No. PCT/US2010/031524.
International Search Report and the Written Opinion dated Jan. 17, 2008 for PCT Application No. PCT/US2007/72260.
International Search Report and the Written Opinion dated Dec. 1, 2010 for PCT Application No. PCT/US2010/033049.
Irigoin et al, Supernode Partitioning, Proceedings of the 15th Annual ACM SIGACT-SIGPLAN Symposium on Principles of Programming Languages, San Diego, CA, Jan. 1988.
JGAP Frequently Asked Questions, Sourceforge.net, pp. 1-61.
Jimenez et al, Register Tiling in Nonrectangular Iteration Spaces, ACM Transactions on Programming Languages and Systems, vol. 24, No. 4, pp. 409-453, Jul. 2002.
Kandemir et al, Optimizing Spatial Locality in Loop Nests using Linear Algebra, Proc. 7th International Workshop on Compliers for Parallel Computers, Sweden Jun. 1998.
Kelly et al, Code Generation for Multiple Mappings, frontiers, Fifth Symposium on the Frontiers of Massively Parallel Computation (Frontiers '95), 1995, pp. 1-11.
Kelly, W. A., Ph.D. Dissertation, Optimization within a Unified Transformation Framework, Dec. 8, 1996, pp. 1-89.
Kildall, G.A., A Unified Approach to Global Program Optimization, Annual Symposium on Principles of Programming Languages, Proceedings of the 1st annual ACM SIGACT-SIGPLAN symposium on Principles of programming languages, pp. 194-206, 1973.
Knoop et al, Partial Dead Code Elimination, Conference on Programming Language Design and Implementation, Proceedings of the ACM SIGPLAN 1994 conference on Programming language design and implementation, pp. 147-158, 1994.
Kodukula et al, An Experimental Evaluation of Tiling and Shacking for Memory Hierarchy Management, ACM ICS'99, 1999, pp. 482-491.
Lam, M., Software Pipeline: An Effective Scheduling Technique for VLIW Machines, Proceedings of the SIGPLAN '88 Conference on Programming Language Design and Implementation, Jun. 22-24, 1988, pp. 318-328.
Landi, W. Undecidability of Static Analysis, From ACM Letters on Programming Languages and Systems, vol. 1, No. 4, 1992, pp. 1-17.
Le Verge, H., A Note on Chernikova's Algorithm, Research Report, Jul. 27, 1994, pp. 1-25.

(56) References Cited

OTHER PUBLICATIONS

Lengauer et al, A Fast Algorithm for Finding Dominators in a Flowgraph, ACM Transaction on Programming Languages and Systems, vol. 1, No. 1, Jul. 1979, pp. 121-141.
Lethin et al, Mapping Loops for the ClearSpeed Processor Using the R-Stream Compiler, Feb. 4, 2008.
Lethin et al, R-Stream: A Parametric High Level Compiler, Reservoir Labs, Inc., 2 pgs.
Lethin et al, The R-Stream 3.0 Compiler, Dec. 18, 2007.
Lethin et al, The R-Stream 3.0 Compiler, Feb. 4, 2008.
Lethin et al, The R-Stream 3.0: Polyheadral Mapper, XPCA Review, Feb. 6, 2007.
Lethin, Software Tools to Optimize BMD Radar Algorithms to COTS Hardware—Final Report, Sep. 12, 2007.
Lim et al, Blocking and Array Contraction Across Arbitrarily Nested Loops Using Affine Partitioning, ACM PPOPP'01, 2001, pp. 1-10.
Lim et al, Maximizing Parallelism and Minimizing Synchronization with Affine Transforms, 24th Annual ACM SIGPLAN-SIGACT Symposium on Principles of Programming Languages, Paris, France, Jan. 1997.
Loechner et al, Precise Data Locality Optimization of Nested Loops, The Journal of Supercomputing, 21, pp. 37-76, 2002.
Maydan et al, Array Data-Flow Analysis and its Use in Array Privatization, ACM-20th PoPL-1, 1993, pp. 2-15.
McWhirter et al, Normalised Givens Rotations for Recursive Least Squares Processing, VLSI Signal Processing, VIII, 1995. IEEE Signal Processing Society [Workshop on], 1995, pp. 323-332.
Megiddo et al, Optimal Weighted Loop Fusion for Parallel Programs, ACM Symposium on Parallel Algorithms and Architectures archive Proceedings of the ninth annual ACM symposium on Parallel algorithms and architectures, pp. 282-291, 1997.
Meister et al, Optimizing and Mapping Tool Chain for FPGA Programming—Final Report Phase 1 SBIR Project, Sep. 28, 2007.
Meister et al, Static Software Tools to Optimize Bmd Radar Algorithms to COTS Hardware, Quarterly Report #1, 2008, pp. 1-22.
Meister, B. Stating and Manipulating Periodicity in the Polytope Model. Applications to Program Analysis and Optimization, Universite Louis Pasteur Strasbourg, 2004, pp. 1-138.
Nookala et al, A Library for Z-Polyhedral Operations, Publication Interne No. 1330, IRISA, Publication No. 1330, May 2000, pp. 1-29.
Pop et al, Fast Recognition of Scalar Evolutions on Three-Address SSA Code, CRI/ENSMP Research Report, A/354/CRI, Apr. 1, 2004.
Pop et al, Induction Variable Analysis with Delayed Abstractions, ACM Transactions on Architecture and Code Optimization, vol. V, No. N, pp. 1-30, Aug. 2005.
Pugh, W. The Omega Test: a fast and practical integer programming algorithm for dependence analysis, ACM, Aug. 1992, pp. 1-19.
Quillere et al, Generation of Efficient Nested Loops from Polyhedra, 2000 Kluwer Academic Publishers, 2000.
Quillere et al, On Code-Generation in the Polyhedral Model, 10 pgs.
Quinton et al, On Manipulating Z-polyhedra, IRISA, Publication Interne No. 1016, Jul. 1996.
Quinton et al, The Mapping of Linear Recurrence Equations on Regular Arrays, Journal of VLSI Signal Processing, vol. 1, 35 pgs. (1989).
Rabinkin et al, Adaptive Array Beamforming with Fixed-Point Arithmetic Matrix Inversion using Givens Rotations, Proc. SPIE vol. 4474, 2001, pp. 294-305.
Rau, B. R., Iterative Modulo scheduling: An Algorithm for Software Pipelining Loops, ACM MICRO, 1994, pp. 63-74.
Reconfigurable Application-Specific Computing User's Guide, 2007, pp. 1-257.
Renganarayana, et al, A Geometric Programming Framework for Optimal Multi-Level Tiling, Conference on High Performance Networking and Computing, Proceedings of the 2004 ACM/IEEE conference on Supercomputing, 2004, 14 pgs.
Reservoir Labs, Inc., Optimizing and Mapping Tool Chain for FPGA Programming, Phase II Proposal, Proposal No. D2-0627, 40 pgs.
Reservoir Labs, Software Tools to Optimize BMD Radar Algorithms to COTS Hardware: Phase II Proposal, Topic No. MDA06-031, Proposal No. B2-1415.
Ros-Giralt et al, Generation of High-Performance Protocol-Aware Analyzers with Applications in Intrusion Detection Systems, Reservoir Labs, 8 pgs.
Ros-Girolt et al, Compilation and Optimization of Protocol Analyzers for High-Speed Network Intrusion Prevention, High Performance Networks / High-Speed Network Security Systems, Topic No. 41b, Reservoir Labs, Inc. 2009, pp. 1-54.
Sankaralingam et al, Distributed Microarchitectural Protocols in the TRIPS Prototype Processor, International Symposium on Microarchitecture, Proceedings of the 39th Annual IEEE/ACM International symposium on Microarchitecture, 2006, 12 pgs.
Schreiber et al, Near-Optimal Allocation of Local Memory Arrays, HP Laboratories Palo Alto, HPL-2004-24, Feb. 17, 2004.
Schwartz et al, VSIPL 1.1 API, 2002, pp. 1-739.
Seghir et al, Counting Points in Integer Affine Transformation of Parametric Z-polytopes, Research report, Universite Louis Pasteur, LSIIT (UMR CNRS 7005), Mar. 2007, pp. 1-24.
Seghir et al, Memory Optimization by Counting Points in Integer Transformation of Parametric Polytopes, ACM CASES'06, 2006, pp. 74-82.
Simpson, L. T., Thesis, Value-Driven Redundancy Elimination, Rice University, 1996, pp. 1-150.
Song et al, A Compiler Framework for Tiling Imperfectly-Nested Loops, Languages and Compilers for Parallel Computing, vol. 1863, 2000, pp. 1-17.
Springer et al, An Architecture for Software Obfuscation—Final Technical Report for Phase 1 SBIR, Jul. 30, 2007.
Springer et al, An Architecture for Software Obfuscation, PowerPoint presentation, 2007.
The Cell Roadmap, Published on PPCNUX at http://www.ppcnux.com/?q=print/6666.
The Polylib Team, Polylib User's Manual, Apr. 24, 2002, pp. 1-44.
Touati et a, Early Control of Register Pressure for Software Pipelined Loops, In Proceedings of the International Conference on Compiler Construction (CC), Warsaw, Poland, Apr. 2003. Springer-Verlag, 15 pgs.
Tu et al, Automatic Array Privatization, Lecture Notes in Computer Science, vol. 1808, 2001, 22 pgs.
Tu, P., Thesis, Automatic Array Privatization and Demand-Driven Symbolic Analysis, University of Illinois, 1995, pp. 1-144.
Udupa et al, Deobfuscation—Reverse Engineering Obfuscated Code, Proceedings of the 12th Working Conference on Reverse Engineering (WCRE'05), 10 pgs. 2005.
Vangal et al, An 80-Tile 1.28TFLOPS Network-on-Chip in 65Nm CMOS, ISSCC 2007, Session 5, Microprocessors/5.2, 3 pgs.
Vasilache et al, Alef: A SAT Solver for MPI-Connected Clusters, Reservoir Labs, 6 pgs.
Vasilache et al, Polyhedral Code Generation in the Real World, Compiler Construction, vol. 3923, 2006, 15 pgs.
Vasilache, Scalable Program Optimization Techniques in the Polyhedral Model, Thesis, Universite de Paris-SUD, UFR Scientifique d'orsay Inria Futures, Sep. 28, 2007.
Verdoolaege et al, Counting Integer Points in Parametric Polytopes using Barvinkok's Rational Functions, Algorithmica, 2007, pp. 1-33.
Wang, C., Dissertation—A Security Architecture for Survivability Mechanisms, University of Virginia, 2000, pp. 1-209.
Wegman et al, Constant Propagation with Conditional Branches, ACM Transactions on Programming Languages and Systems, vol. 13, No. 2, Apr. 1991, pp. 181-210.
Weise et al, Value Dependence Graphs: Representation Without Taxation, Annual Symposium on Principles of Programming Languages, Proceedings of the 21st ACM SIGPLAN-SIGACT symposium on Principles of programming languages, 1994, 14 pgs.
Whaley et al, An Efficient Inclusion-Based Points-To Analysis for Strictly-Typed Languages, Lecture Notes in Computer Science, vol. 2477, 2002, 16 pgs.
Wilde, D. K., A Library for Doing Polyhedral Operations, IRISA, Publication No. 785, 1993, pp. 1-48.

(56) References Cited

OTHER PUBLICATIONS

Wolf et al, A Data Locality Optimizing Algorithm, Proceedings of the ACM SIGPLAN '91 Conference on Programming Language Design and Implementation, Jun. 26-28, 1991, pp. 30-44.

Wu et al, Static Branch Frequency and Program Profile Analysis, 27th IEEE/ACM International Symposium on Microarchitecture (MICRO-27), 1994, 11 pgs.

Xue et al, Enabling Loop Fusion and Tiling for Cache Performance by Fixing Fusion-Preventing Data Dependences, Proceedings of the 2005 International Conference on Parallel Processing (ICPP'05), 2005, pp. 1-9.

Xue, On Tiling as a Loop Transformation, Department of Mathematics, Statistics and Computing Science, University of New England, Australia, 15 pgs.

Buluc et al, Parallel Sparse Matrix-Matrix Multiplication and Indexing: Implementation and Experiments, SIAM Journal of Scientific Computing (SISC), 2012.

Chang et al, Parallel sparse supports for array intrinsic functions of Fortran 90, J. Supercomput. 18(3):305-339, (2001).

Davis, Direct Methods for Sparse Linear Systems. SIAM, 2006 (100 pgs.).

Gundersen et al, Sparsity in higher order methods for unconstrained optimization, Optimization Methods and Software, 27(2):275-294 (2012).

Gustavson, Two Fast Algorithms for Sparse Matrices: Multiplication and Permuted Transposition, ACM Transactions on Mathematical Software, 4(3): 250-269, 1978.

Kolda et al, Scalable Tensor Decompositions for Multiaspect Data Mining, in ICDM 2008: Proceedings of the 8th IEEE International Conference on Data Mining, Dec. 2008, pp. 363-372.

Lathauwer et al, On the Best Rank-1 and Rank-$(R_1,R_2,\ldots,R_N)$ Approximation of Higher-Order Tensors, SIAM J. Matrix Anal. Appl., 21:1324-1342, Mar. 2000.

Lin et al, Efficient data compression methods for multidimensional sparse array operations based on the EKMR scheme IEEE Trans. Comput., 52 12 :1640-1646, 2003.

Lin et al, Efficient Representation Scheme for Multidimensional Array Operations, IEEE Transactions on Computers 51:327-345, 2002.

Vera et al, An Accurate Cost Model for Guiding Data Locality Transformations—Politecnica de Catalunya-Barcelona University—Sep. 2005.

Jonsson et al., "Verifying Safety Properties of a Class of Infinite-State Distributed Algorithms", Lecture Notes in Computer Science, 1995, vol. 939, pp. 42-53.

Mahajan et al., "Zchaff2004: An Efficient SAT Solver", LNCS, 2005, pp. 360-375.

International Preliminary Report on Patentability dated Oct. 27, 2011 for PCT Application No. PCT/US2010/031524.

International Preliminary Report on Patentability dated Jan. 6, 2009 for PCT Application No. PCT/U62007/72260.

International Preliminary Report on Patentability dated Nov. 1, 2011 for PCT Application No. PCT/US2010/033049.

\* cited by examiner

SYSTEMS AND METHODS FOR PLANNING A SOLUTION TO A DYNAMICALLY CHANGING PROBLEM

CROSS REFERENCE TO RELATED APPLICATIONS

This application is related to and claims the benefit of priority to U.S. Provisional Application Ser. No. 61/350,443, titled "METHOD OF SAT-BASED ITERATIVE REPAIR," filed Jun. 1, 2010, the entirety of which is hereby incorporated by reference.

GOVERNMENT INTERESTS

Portions of this invention were made with U.S. Government support under contract number W31P4Q-05-C-R171 awarded by Defense Advanced Research Projects Agency and contract number W9113M-10-C-0089 awarded by the Missile Defense Agency. The U.S. Government has certain rights in the invention

FIELD OF THE INVENTION

The invention relates generally to the field of planning solutions to problems involving dynamically changing requirements (i.e., constraints), and in particular to solving such problems using satisfiability algorithms.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Boolean Satisfiability (SAT) solvers are useful in a variety of problems. SAT problems arise in a number of arenas, the field of planning being an example of an important arena. As the demand for more efficient use of heterogeneous and interdependent resources has increased, so has the complexity of the constraint problems that must be solved to assign and employ those resources. With the increase in the complexity of the constraint problems that must be solved there have been significant increases in the challenges within the problem of finding feasible plans that make a highly efficient use of the available resources.

In the planning process a number of computerized techniques have been employed. For example, a common technique is to reduce the planning problem to the combination of a set of constraints and a fitness metric. The constraints capture plans that are consistent with the rules of the world in which the plan is to takes place. The fitness metric provides a means of ordering feasible plans based on desirability. In general, SAT solvers have long provided a means to find solutions to the constraint component. SAT solvers can also be used to find plans that satisfy constraints while meeting a certain fixed threshold of fitness.

However, a SAT solver typically lacks the ability to find an optimal solution, i.e., one that maximizes or minimizes a specified fitness metric while satisfying the constraints system, in a single step. Generally, a SAT solver is configured to find a solution at one fitness level, and is then repeatedly executed anew by requiring a higher fitness threshold in each iteration until a fitness level is reached for which the constraint system is satisfiable at that level, but unsatisfiable at any higher level. The solution that satisfies the constraints at the highest fitness level is determined to be the optimal solution.

SAT solvers typically require the constraint formulae to be expressed in the conjunctive normal form (CNF), which is a conjunction of clauses, where a clause is a disjunction of literals. A literal is either a variable name or its negation. A satisfying assignment of variables returned by the SAT solver corresponds to a plan of fitness greater than or equal to k. If the problem is unsatisfiable at fitness k, the SAT solver returns a proof that there are no plans of fitness greater than or equal to k.

Iterative Repair (IR) is a general mechanism that extends the normal capability of a SAT-solver so that it may address several additional application problem domains. For example, the IR capability is beneficial for applying a SAT solver in a domain where the environment may change. Changes in the environment are reflected as changes in the constraint system embodied in a logic formula being solved. The changes are typically provided by a driver application.

In many defense and commercial applications, the solution to a planning problem automatically rendered by a SAT solver is subject to manual review before a commitment to apply or execute the solution is made. The IR capability provides a mechanism for replanning, in part or in whole, if a change introduced by a manual review. However, SAT is an NP-complete problem (i.e., a class of problem for which only the solutions requiring exponential time are currently known). Solved iteratively for increasing fitness values, k, the IR can produce provably optimal solutions for NP-hard k-optimization problems (i.e., problems that are as hard as NP-complete problems). In this method, a SAT instance is modified for each k and is resolved producing a better solution until k reaches a level at which the problem is unsatisfiable, thus providing a proof of optimality. As described above, changing a fitness level can be analogized to modifying the problem in terms of its constraints. Managing the fitness levels to be tested and translating those levels into a modified problem is generally performed by a driver application. In these examples, the driver application interacts with the IR-enabled SAT solver.

The Davis-Putnam-Logemann-Loveland (DPLL) algorithm is a complete backtracking-based algorithm for deciding the satisfiability of propositional logic formulae in conjunctive normal form, i.e., for solving the CNF-SAT problem. The basic backtracking algorithm runs by choosing a branching literal, assigning a truth value to it, simplifying the formula, and then recursively checking if the simplified formula is satisfiable. If this is the case, the original formula is satisfiable; otherwise, the same recursive check is done assuming the opposite truth value. This is known as the splitting rule, as it splits the problem into two simpler sub-problems. The simplification step normally removes all clauses from the formula that become true under the assignment being tested, and all literals that become false from the remaining clauses.

Various improvements of the DPLL are known in the field. One such improvement is defining variants of the basic backtracking algorithm. Techniques in this area include non-chronological backtracking and clause learning. These refinements describe a method of backtracking after reaching a conflict which "learns" the root causes of the conflict (i.e., conflicting assignments to variables) in order to avoid reaching the same conflict again. Intuitively, backtracking can be viewed as jumping back to the root problem in a sequence of decisions and making the opposite decision.

In finding an optimal plan, updating a fitness threshold in each successive iteration, as described above, is equivalent to changing an original clause. An original clause may also be changed in response to a change in constraints resulting from a change in the environment of the problem. The SAT solver attempts to find a new plan by resolving the changed and unchanged original clauses. To this end, the present backtracking algorithms assume that the root conflict clauses (i.e., the learned clauses that can avoid repeating a conflict) are logical implications of the original clauses of the formula being solved. Therefore, when one or more original clauses are changed, in a subsequent iteration all conflict causes are relearned, requiring significant time. As such, in complex resource assignment and employment problems, existing planning approaches may need to search a large space of several potentially feasible plans. Accordingly, planning at each level of fitness by resolving the modified and unmodified clauses can take a significant time, rendering the back-tracking method impractical or unusable in situations requiring a rapid solution.

SUMMARY OF THE INVENTION

In various embodiments of the present invention, a plan representing a final solution to a modified problem is determined efficiently by reusing elements (i.e., portions) of previously obtained partial solutions to the problem prior to its modification. This is achieved, in part, by analyzing the modification, and identifying elements of solutions that are not invalidated by the modification of the problem.

Often, planning at closely related fitness levels can result in the rediscovery of large numbers of learned clauses that are unaffected by the change in fitness. This rediscovery represents redundant work that increases the time to find an optimal solution. By identifying and retaining the unaffected learned clauses, the subsequent iteration of the problem solving process can adapt efficiently to the changed fitness thresholds. The root causes of any conflict introduced by the modified clauses representing the updated fitness and/or constraint change are identified, and the learned information based only on the modified, obsolete clauses is removed. However, the learned information based on the unmodified original clauses is retained as solution elements, and even the information based on the removed clauses is reused as potentially valid solution elements, which can improve performance of the solution-finding process.

In particular, in various embodiments the present invention enables dynamically adding and removing both variables and clauses during and/or after the process of solving a SAT problem. The implication graph that shows which learned clauses are implied from which original and previously learned clauses is retained. The resulting relation is a directed acyclic graph (DAG) rooted in the original clauses. The output of the solver includes not only the final solution but also the learned clauses, the clause implication graph, variable scores, and the decision stack (with antecedent clause references, as described below). This information is also available in memory during the solution process and is updated continuously. The final state of the solving process can be restored from the additional retained information, and a modification to the problem can be accepted. Then, from the restored state based on the retained information the problem is resolved to find a final solution efficiently.

Accordingly, in one aspect, a computer-implemented method is provided for solving a planning problem. The method includes receiving in memory a formula that includes a number of original clauses, and represents the planning problem. The method also includes configuring a processor to solve the formula, so as to generate a final solution to the planning problem. The final solution may include several solution elements. Moreover, the method includes receiving a modification to the formula prior to generating the final solution and analyzing the modified formula, so as to identify the solution elements that have been invalidated by the modification. Finally, the processor is reconfigured to resolve the modified formula, such that the solution elements that have not been invalidated are reused in generating the final solution. Such reuse can increase the performance of the process of finding a solution to the problem.

The generation of the final solution may include learning a first clause based on an original clause belonging to the various original clauses included in the formula, and associating a set of antecedent clauses with the learned first clause. The set of antecedent clauses may include the original clause. The generation of the final solution may also include recording for the learned first clause the associated set of antecedent clauses, such that they may be reused while resolving the problem.

In some provided embodiments, the learning process includes reverse Boolean constraint propagation, and the recording includes tagging the learned first clause and each clause belonging to the associated set of antecedent clauses, and saving the tagged clauses. Accordingly, the learned first clause can be traced back to the corresponding original clause.

The method may include learning a second clause based on the learned first clause and associating a set of antecedent clauses with the learned second clause. The set of antecedent clauses may include the learned first clause and the original clause. The method may further include recording for the learned second clause the associated set of antecedent clauses.

In some provided embodiments the learned first clause and all antecedent clauses belonging to the associated set of antecedent clauses include a number of literals. In these embodiments, the method further includes assigning a value to one of the literals, and associating the assignment with the learned first clause. The method may also include outputting the learned first clause and the associated set of antecedent clauses.

In some provided embodiments, the formula includes a first literal belonging to one of the several original clauses, and the generation of the final solution includes assigning a value to the first literal, implying an assignment of a value to a second literal via Boolean constraint propagation, and recording for the implied assignment, a set of antecedent clauses associated with a clause to which the second literal belongs. The implied assignment, the clause to which the second literal belongs, and the set of antecedent clauses associated with that clause may be output for subsequent reuse.

In some provided embodiments, reconfiguring the processor includes identifying one or more learned clauses associated with a first original clause belonging to the several original clauses. The reconfiguration also includes removing each of the one or more learned clauses associated with the first original clause, removing the first original clause, and retaining as solution elements, the learned clauses associated with a second original clause belonging to the several original clauses. Reconfiguring the processor may also include identifying assignments of values to the literals associated with each of the identified learned clauses, and storing the identified assignments as candidate solution elements. Furthermore, the reconfiguration may include removing the assignments and retaining as solution elements, the assignments of values to the literals associated with the learned clauses that may be associated with the second original clause.

The formula may include variables, and the modification may include removing a variable belonging to the plurality of variables. Accordingly, the analyzing includes identifying an original clause that include a literal corresponding to the removed variable, and removing the learned clauses associated with the identified original clause. The modification may also include adding a new variable and/or adding a new original clause to the several original clauses.

If a new clause is added, the analyzing process may include identifying by testing whether a current variable assignment conflicts with the new original clause, and, if the assignment is conflicting, identifying a latest non-conflicting decision level resulting, in part, the current variable assignment. The analyzing process may also include removing assignment of value to each variable occurring at a subsequent decision level. The analyzing process may further include saving the removed assignments, and reconfiguring the processor may include testing the saved assignments as solution elements.

In another aspect, an apparatus that includes a processor and a memory is provided for solving a planning problem. The memory includes processor-executable instructions that, when executed by the processor, configure the apparatus to receive in memory a formula that includes a number of original clauses, and represents the planning problem. The instructions also include configuring a processor to solve the formula, so as to generate a final solution to the planning problem. The final solution may include several solution elements. Moreover, the instructions configure the apparatus for receiving a modification to the formula prior to generating the final solution and analyzing the modified formula, so as to identify the solution elements that have been invalidated by the modification. Finally, the instructions reconfigure the processor to resolve the modified formula, such that the solution elements that have not been invalidated are reused in generating the final solution. Such reuse can increase the performance of the process of finding a solution to the problem.

The generation of the final solution may include learning a first clause based on an original clause belonging to the various original clauses included in the formula, and associating a set of antecedent clauses with the learned first clause. The set of antecedent clauses may include the original clause. The generation of the final solution may also include recording for the learned first clause the associated set of antecedent clauses, such that they may be reused while resolving the problem.

In some provided embodiments, the learning process includes reverse Boolean constraint propagation, and the recording includes tagging the learned first clause and each clause belonging to the associated set of antecedent clauses, and saving the tagged clauses. Accordingly, the learned first clause can be traced back to the corresponding original clause.

The instructions may configure the apparatus to learn a second clause based on the learned first clause and associating a set of antecedent clauses with the learned second clause. The set of antecedent clauses may include the learned first clause and the original clause. The apparatus may further be configured by the instructions to record, for the learned second clause, the associated set of antecedent clauses.

In some provided embodiments the learned first clause and all antecedent clauses belonging to the associated set of antecedent clauses include a number of literals. In these embodiments, the instructions further configure the apparatus to assign a value to one of the literals, and associating the assignment with the learned first clause. The apparatus may also be configured by the instructions to output the learned first clause and the associated set of antecedent clauses.

In some provided embodiments, the formula includes a first literal belonging to one of the several original clauses, and the generation of the final solution includes assigning a value to the first literal, implying an assignment of a value to a second literal via Boolean constraint propagation, and recording for the implied assignment, a set of antecedent clauses associated with a clause to which the second literal belongs. The implied assignment, the clause to which the second literal belongs, and the set of antecedent clauses associated with that clause may be output for subsequent reuse.

In some provided embodiments, reconfiguring the processor includes identifying one or more learned clauses associated with a first original clause belonging to the several original clauses. The reconfiguration also includes removing each of the one or more learned clauses associated with the first original clause, removing the first original clause, and retaining as solution elements, the learned clauses associated with a second original clause belonging to the several original clauses. Reconfiguring the processor may also include identifying assignments of values to the literals associated with each of the identified learned clauses, and storing the identified assignments as candidate solution elements. Furthermore, the reconfiguration may include removing the assignments and retaining as solution elements, the assignments of values to the literals associated with the learned clauses that may be associated with the second original clause.

The formula may include variables, and the modification may include removing a variable belonging to the plurality of variables. Accordingly, the analyzing includes identifying an original clause that include a literal corresponding to the removed variable, and removing the learned clauses associated with the identified original clause. The modification may also include adding a new variable and/or adding a new original clause to the several original clauses.

If a new clause is added, the analyzing process may include identifying by testing whether a current variable assignment conflicts with the new original clause, and, if the assignment is conflicting, identifying a latest non-conflicting decision level resulting, in part, the current variable assignment. The analyzing process may also include removing assignment of value to each variable occurring at a subsequent decision level. The analyzing process may further include saving the removed assignments, and reconfiguring the processor may include testing the saved assignments as solution elements.

In another aspect, an article of manufacture, comprising a non-transitory machine-readable medium storing instructions is provided for solving a planning problem. The stored instructions when executed by the machine, configure the machine to receive in memory a formula that includes a number of original clauses, and represents the planning problem. The instructions also include configuring a processor included in the machine to solve the formula, so as to generate a final solution to the planning problem. The final solution may include several solution elements. Moreover, the instructions configure the machine for receiving a modification to the formula prior to generating the final solution and analyzing the modified formula, so as to identify the solution elements that have been invalidated by the modification. Finally, the instructions reconfigure the processor to resolve the modified formula, such that the solution elements that have not been invalidated are reused in generating the final solution. Such reuse can increase the performance of the process of finding a solution to the problem.

The generation of the final solution may include learning a first clause based on an original clause belonging to the various original clauses included in the formula, and associating a set of antecedent clauses with the learned first clause. The set of antecedent clauses may include the original clause. The generation of the final solution may also include recording for the learned first clause the associated set of antecedent clauses, such that they may be reused while resolving the problem.

In some provided embodiments, the learning process includes reverse Boolean constraint propagation, and the recording includes tagging the learned first clause and each clause belonging to the associated set of antecedent clauses, and saving the tagged clauses. Accordingly, the learned first clause can be traced back to the corresponding original clause.

The instructions may configure the machine to learn a second clause based on the learned first clause and associating a set of antecedent clauses with the learned second clause. The set of antecedent clauses may include the learned first clause and the original clause. The machine may further be configured by the instructions to record, for the learned second clause, the associated set of antecedent clauses.

In some provided embodiments the learned first clause and all antecedent clauses belonging to the associated set of antecedent clauses include a number of literals. In these embodiments, the instructions further configure the machine to assign a value to one of the literals, and associating the assignment with the learned first clause. The machine may also be configured by the instructions to output the learned first clause and the associated set of antecedent clauses.

In some provided embodiments, the formula includes a first literal belonging to one of the several original clauses, and the generation of the final solution includes assigning a value to the first literal, implying an assignment of a value to a second literal via Boolean constraint propagation, and recording for the implied assignment, a set of antecedent clauses associated with a clause to which the second literal belongs. The implied assignment, the clause to which the second literal belongs, and the set of antecedent clauses associated with that clause may be output for subsequent reuse.

In some provided embodiments, reconfiguring the processor includes identifying one or more learned clauses associated with a first original clause belonging to the several original clauses. The reconfiguration also includes removing each of the one or more learned clauses associated with the first original clause, removing the first original clause, and retaining as solution elements, the learned clauses associated with a second original clause belonging to the several original clauses. Reconfiguring the processor may also include identifying assignments of values to the literals associated with each of the identified learned clauses, and storing the identified assignments as candidate solution elements. Furthermore, the reconfiguration may include removing the assignments and retaining as solution elements, the assignments of values to the literals associated with the learned clauses that may be associated with the second original clause.

The formula may include variables, and the modification may include removing a variable belonging to the plurality of variables. Accordingly, the analyzing includes identifying an original clause that include a literal corresponding to the removed variable, and removing the learned clauses associated with the identified original clause. The modification may also include adding a new variable and/or adding a new original clause to the several original clauses.

If a new clause is added, the analyzing process may include identifying by testing whether a current variable assignment conflicts with the new original clause, and, if the assignment is conflicting, identifying a latest non-conflicting decision level resulting, in part, the current variable assignment. The analyzing process may also include removing assignment of value to each variable occurring at a subsequent decision level. The analyzing process may further include saving the removed assignments, and reconfiguring the processor may include testing the saved assignments as solution elements.

These and other features and advantages of the present invention will be appreciated from review of the following detailed description of the invention, along with the accompanying figures in which like reference numerals refer to like parts throughout.

BRIEF DESCRIPTION OF THE DRAWINGS

Various embodiments taught herein are illustrated by way of example, and not by way of limitation, in the figures of the accompanying drawings, in which.

Figure 1:
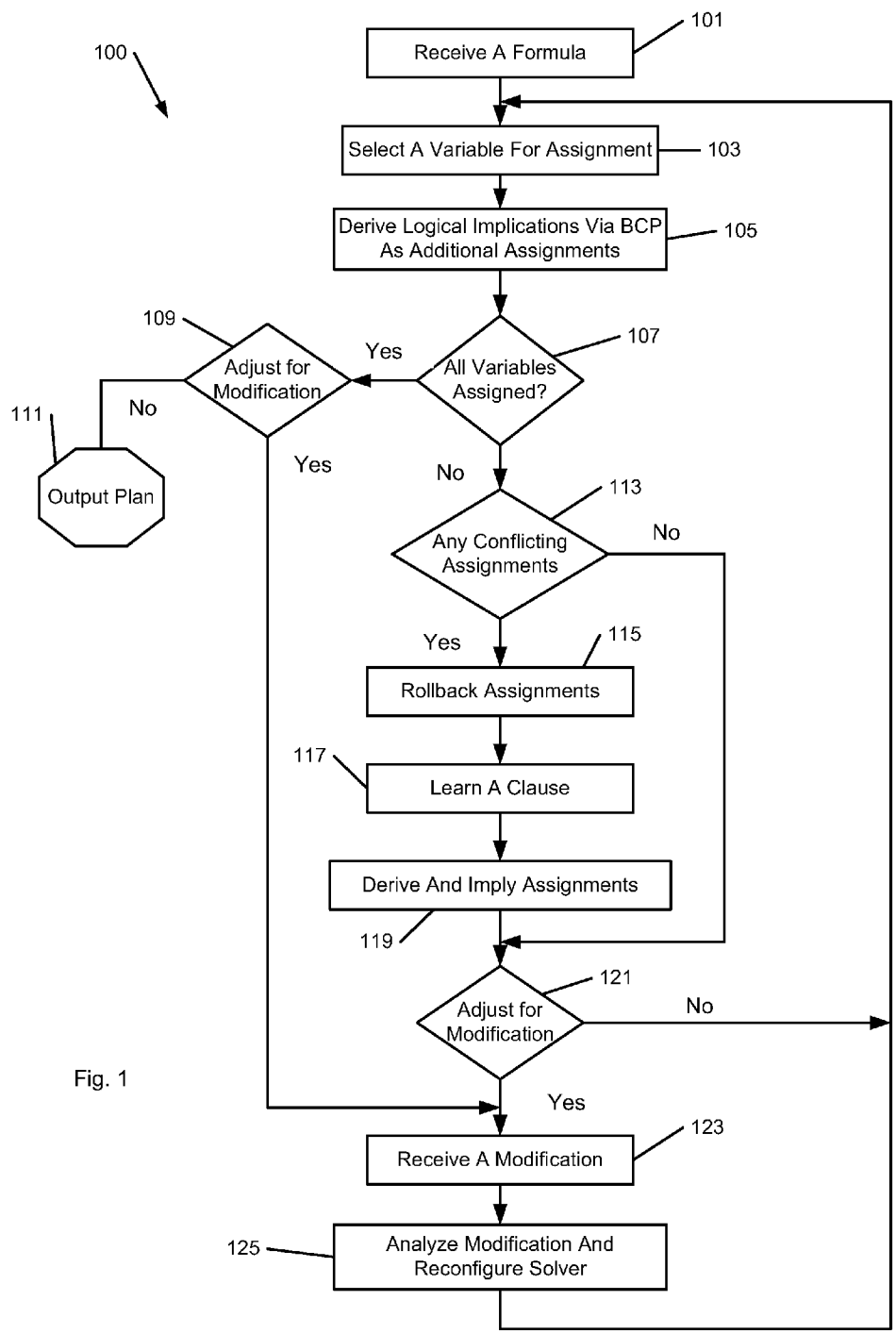
FIG. 1 depicts a flow chart showing an iterative planning (i.e., repair) method in accordance with one provided embodiment of the invention.

It will be recognized that some or all of the Figures are schematic representations for purposes of illustration and do not necessarily depict the actual relative sizes or locations of the elements shown. The Figures are provided for the purpose of illustrating one or more embodiments with the explicit understanding that they will not be used to limit the scope or the meaning of the claims.

DETAILED DESCRIPTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well-known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution, and a component can be localized on one computer and/or distributed between two or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a computer-readable medium. Computer-readable media is non-transitory in nature and includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM, or other optical disk storage, magnetic disk storage, or other magnetic storage devices, or any other medium that can be used to carry or store desired program code in the form of instructions or data structures and that can be accessed by a computer. Also, any physical connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc (BD), where disks usually reproduce data magnetically and discs reproduce data optically with lasers. Combinations of the above should also be included within the scope of computer-readable media.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Iterative Repair (IR) generally refers to a technique in propositional constraint solving in which elements of the formula being tested for satisfaction change, either during the solution process or after a first solution has been returned. In the context of a Boolean Satisfiability (SAT) solver, IR refers to a change, either in the number of variables in the formula being evaluated or the addition or subtraction of clauses to the formula. The goal of a typical IR is to redirect the solution process, subject to the modified problem definition and the need to keep the algorithm in a consistent state, with the least possible loss of intermediate information that is not invalidated. For SAT, this intermediate information usually takes the form of the current assignment stack (i.e., partial assignment), Variable State Independent Decaying Sum (VSIDS), or other heuristic scores for variables, and learned conflict clauses retained in the clause database.

Referring to FIG. 1, in an exemplary process 100 a problem represented as a formula including set of original clauses is received in memory in step 101. Each original clause includes literals that correspond to a number of variables. A variable is chosen for assignment called a decision assignment, and a true or false value is assigned to the variable in step 103.

In step 105, the logical implications of that assignment are discovered through a process called Boolean Constraint Propagation (BCP). These implications become additional assignments which are then also propagated serially using a work queue. An iteration of the process 100 is completed when it is determined in step 107 that all variables are assigned, indicating that the problem as described by the current formula is solved. If it is determined in step 109 that the formula need not be adjusted in response to a received modification, the solution to the problem (e.g., a plan) is output in step 111.

In some instances, however, there are no more assignments to propagate in step 105, yet all variables of the formula are not assigned. Within the current partial assignment, if no conflicting assignment is found in step 113, the process 100 is repeated with a new decision assignment in step 103. Prior to repeating the process 100, the processor (e.g., a solver) executing the process 100 may check in step 121 if the formula has been modified, and if so, may receive the modification in step 123. In step 125, the processor is reconfigured, as more fully explained below, and then the process 100 is repeated starting from step 103 in which a new variable is selected for assignment.

The various assignments described in the process 100 occur sequentially and may be referred to as the assignment stack. As used herein, the "assignment stack" may also mean a data structure that enables recording and accessing assignments. The decision assignments in the stack, i.e., the assignments performed in step 103 partition the stack into decision levels. The assignments that are discovered to be absolute are said to be decision-level zero (DL 0). The first decision made at step 103 marks the beginning of DL 1. This decision level includes that decision assignment, and in addition all of the BCP-implied assignments discovered from that assignment, such as those made in steps 105, 119. As described above, if the BCP process neither solves the problem, nor ends in a conflict, the next decision assignment made by returning to step 103 as described above, marking the beginning of DL 2.

If a conflict is discovered in step 113 (i.e., a variable is assigned both true and false values), a sub-process referred to as reverse BCP is invoked in which, in step 115, the assignment stack is rolled back to some earlier decision level (one or more levels). In effect one or more assignments previously made in steps 103, 105, or 119 are undone, i.e., the variables to which values were assigned are marked as unassigned. The number of decision levels rolled back, and, accordingly, the number of assignments that may be undone is determined by the number of roll backs necessary to resolve and avoid reoccurrence of the conflict. A conflict caused by DL 0 assignments, i.e., a situation in which the level zero is reached while resolving conflict but the conflict still exists, results in a return of UNSAT for the problem. This implies that under the specified constraints, no solution exits to the problem.

One or more learned conflict clauses may also be generated in step 117. These clauses are logical implications of the original and previously learned clauses, and they avoid re-generating the conflict that was discovered during the last execution of step 113. All clauses, both original and learned, are stored in a list-based data structure referred to as the clause database. The clause database includes a system of pointers referred to as watch lists accessing relevant clauses during the BCP process. Clauses can be added to and removed from this data structure. Finally in step 119, learning a conflict clause (in step 117) may also add an assignment to the new top-of-stack decision level (i.e., the decision level reached after roll back in step 115 that eliminated the conflict is completed) as a logical implication of the clause learned. This assignment is then propagated by the BCP similarly as in step 105. Any new conflict discovered can be resolved as described above.

In one embodiment, the BCP operates by repetitive application of a single rule referred to as the unit clause rule. This rule says that if all but exactly one of the variables appearing as literals of a clause have been assigned, and the clause is still not satisfied (i.e., none of the literals is true), then the assignment to the remaining variable is forced such that the remaining literal is true. Thus, the assignment to the remaining variable is an implied assignment. An assignment implied via BCP can be traced to a single clause called an antecedent clause, and to the earlier assignments in the assignment stack. The assignment stack includes a reference to the antecedent clause corresponding to each implied assignment. This reference, in part, enables the reverse-BCP sub-process shown as steps 115-119 in the process 100. The clauses in the clause database and the assignments in the assignment stack may be tagged (e.g., using flags, pointers, etc.) to identify the corresponding antecedent clauses.

As part of the BCP, information based on memory-access patterns is collected and condensed into a score for each variable (e.g., via the VSIDS heuristic). This information is then used to influence which variable should be chosen whenever a new (otherwise unbound) decision needs to be made in the step 103.

The formula received in step 101 may be modified in step 123 in response from some external request, such a user request to add a new constraint or to remove an existing one, or a request to change the required fitness of the solution. In response to a formula modification, the processor is reconfigured in step 125 to resolve the modified problem (also called repairing the solution). The state of the processor and the solution or partial solution in step 125 is stable in that all clauses and assignments that may result from the application of BCP and reverse BCP as described above have been explored.

Figure 2:
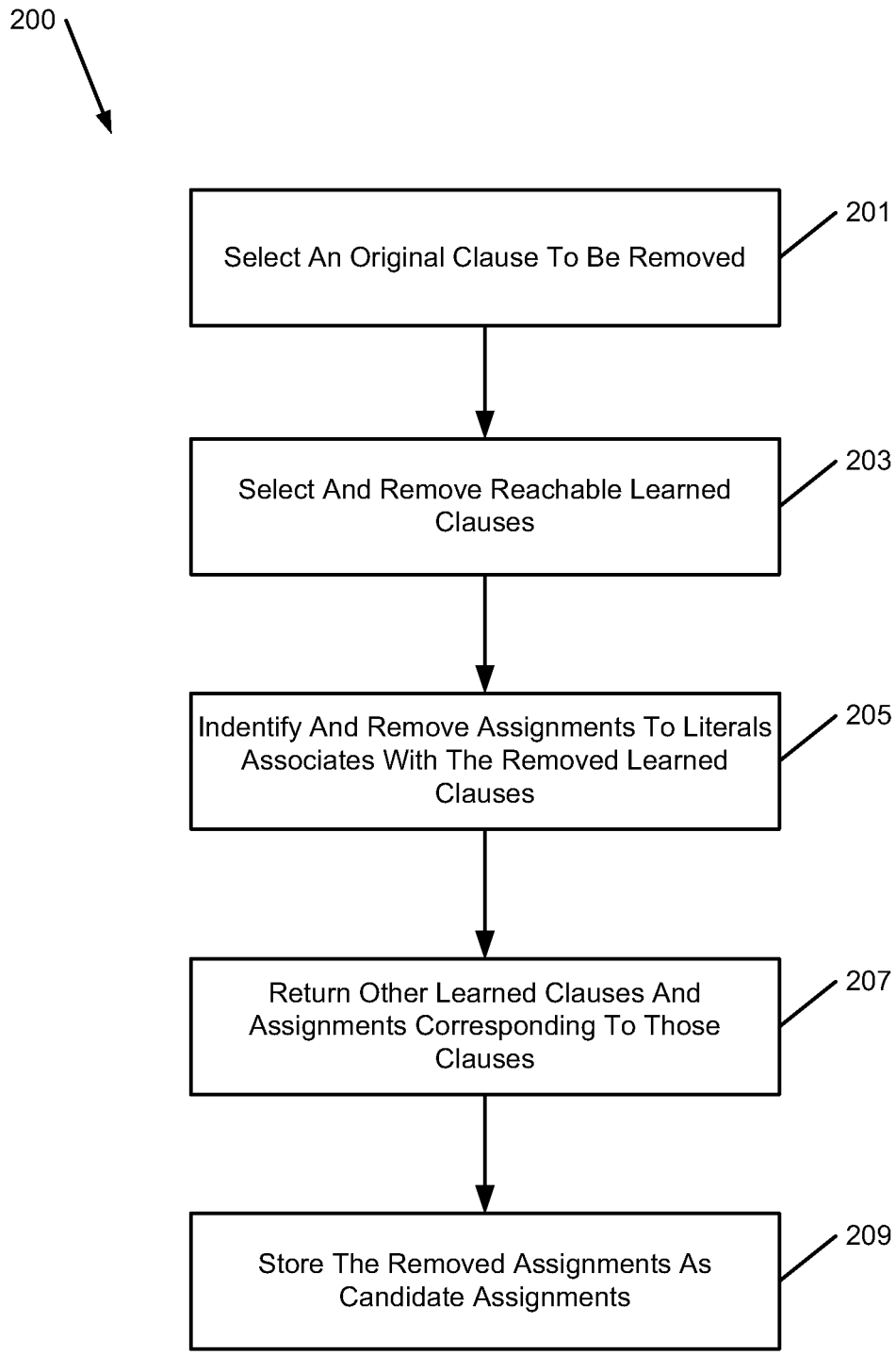
FIG. 2 depicts a flow chart showing modification of a problem by removing a clause in accordance with various embodiments of the invention.

One of the various modifications to the formula that may be received in step 123 includes removing an original clause from the formula. The removal of a clause generally implies the removal of one or more constrains of the problem, and may affects both the assignment stack and the clause database. Accordingly, the reconfiguration of the processor, as described with reference to FIG. 2 includes selecting the original clause to be removed in step 201. In step 203 all learned clauses reachable from the selected original clause in the directed, acyclic clause implication graph are selected and removed from the clause database. In one embodiment, this is achieved by removing all nodes corresponding to the removed clauses and all edges incident upon those nodes from the clause implication graph. The original clause may also be removed.

In step 205 the assignment stack is inspected, beginning from the lowest decision level, until an assignment is found whose antecedent clauses is one that was removed in step 203, i.e., the antecedent clause is no longer in the clause database. The decision level is then rolled back to the highest complete decision level such that each assignment in the assignment stack still has its antecedent clause in the clause database. In general, this level is one level below the level at which the search described above stopped. If no such assignment was found, then the assignment stack is determined to be unaffected by the modification. If such an assignment was found at DL 0, then the assignment stack is rolled back to DL 0. All of the assignments at DL 0 are inspected, and all assignments whose antecedent clause is no longer in the clause database are removed. DL 0 is then compacted to the remaining set of assignments.

In step 207, the other learned clauses, i.e., the learned clauses derived from other original clauses not removed by the modification are retained in the clause database for use in the subsequent iterations of the steps of the process 100 depicted in FIG. 1. The assignments corresponding to the retained learned clauses are also retained in the assignment stack. Moreover, as part of rolling back the decisions stack in the step 205, the sequence of decision assignments and other assignments whose antecedent clause have been removed is saved for reuse in step 209. These assignments are saved in the order in which they appear in the assignment stack i.e., from lowest decision level to highest.

The process 100 described above with reference to FIG. 1 resumes from step 103 using the saved set of assignments as the next sequence of decisions to be made. In this, the influence of the VSIDS scores may be overridden. The modified formula may not imply these assignments as they may have resulted solely from the removed original clause. Nevertheless, reusing the stored assignments to guide assignment decisions, e.g., in step 103 can yield significant performance improvements. The stored sequence is used for subsequent decisions (e.g., in steps 103, 105, 119 of the process 100) until the sequence is exhausted or any conflict is found through the BCP in step 113. In that event, the algorithm resumes with making decisions according to the default method such as that based on the VSIDS scores.

The removal of an original clause may not invalidate a partial assignment, but may leave the assignment stack in an inconsistent state. By inconsistent state it is meant that the removed antecedent clause references may block the correct execution of the reverse BCP process, if it were necessary to resolve a conflict. The rollback in step 205, saving learned clauses and assignments in step 209, and reusing them in the steps of process 100 can ensure that each assignment in the assignment stack is properly supported by an antecedent clause in the clause database.

Another modification to the formula that may be received in step 123 includes removing a variable, which is considered to be equivalent to the removal of all clauses that include the variable to be removed. Therefore, the clause database is inspected, all clauses referencing the variable are enumerated, and the clauses are removed sequentially using steps 201-209 shown in FIG. 2 along with the process 100 shown in FIG. 1. Clauses removed as a consequence of removing a clause earlier in the enumeration are skipped. Any VSIDS score associated with the variable removed is set to zero before the process 100 of FIG. 1 resumes in the step 103.

Figure 3:
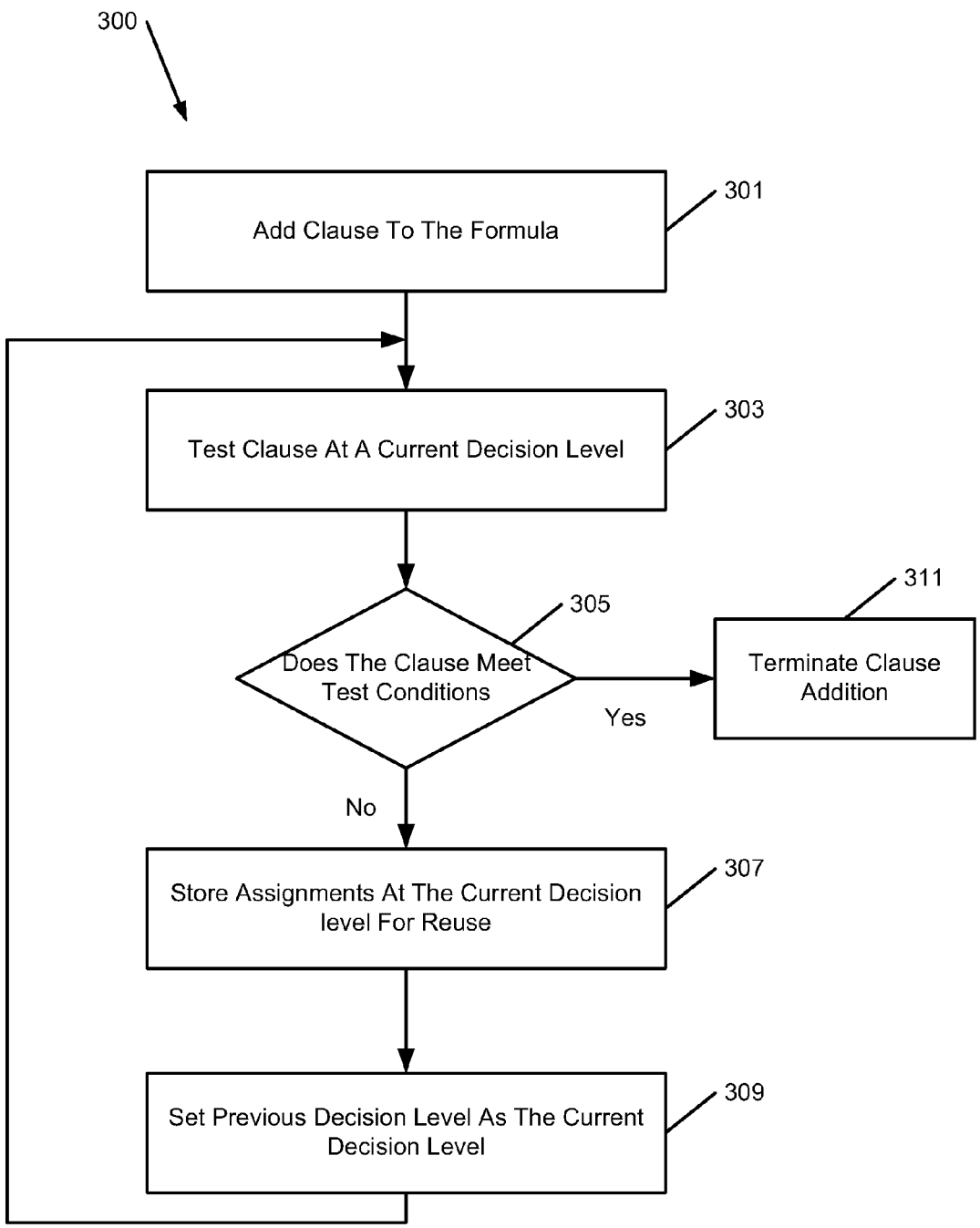
FIG. 3 depicts a flow chart showing modification of a problem by adding a clause in accordance with various embodiments of the invention.
Figure 4:
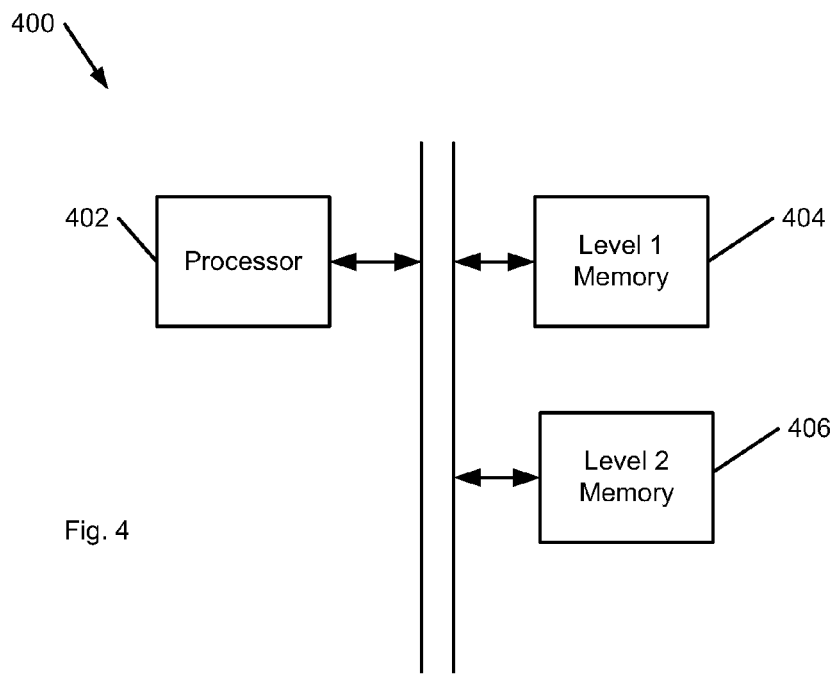
FIG. 4 depicts a system according to one provided embodiment of the invention.

Yet another formula modification that may be performed in step 123 is adding an original clause, which generally indicates adding a constraint to the problem. The addition of an original clause affects both the assignment stack and clause database. With reference to FIG. 3, the new original clause is added to the clause database in step 301. In step 303, the new original clause is tested for certain conditions against the current partial assignment, i.e., against the variable assignments represented by the current decision level in the assignment stack. In one embodiment, if it is determined in step 305 that the clause has at least two unassigned literals, the modification (i.e., addition) of the new clause in the step 123 of FIG. 1 terminates as shown in step 311. Alternatively, if it is determined in step 305 that the clause is satisfied and has only a single unassigned literal, then also the modification operation in the step 123 of FIG. 1 terminates.

If the test are not met, in step 307 the assignments at the current decision level are stored, and the assignment stack is rolled back one complete decision level in step 309. The steps 303-309 are repeated until the assignment stack is rolled back to the highest complete decision level that meets the test conditions evaluated and verified in the steps 303, 305 (i.e., the clause has at least two unassigned literals, or the clause is satisfied and has only a single unassigned literal).

During these iterations, if the decision level to which the assignment stack is rolled back in the step 309 is DL 0, additional tests take place. For example, if the number of unassigned literals is zero and the clause is unsatisfied, the algorithm terminates with the result UNSAT, indicating that the addition of the new clause in the step 123 of FIG. 1 rendered the problem unsolvable. If the number of unassigned literals is one and the clause is unsatisfied, the assignment implied by the unit clause rule is added to DL 0. Otherwise, if the decision level to which the assignment stack is rolled back in the step 309 is other than DL 0, the process 100 of FIG. 1 continues from the step 103. The assignments saved in each iteration of the step 307 are saved in the order in which they appear in the assignment stack, i.e., from the lowest decision level to the highest.

When the process 100 of FIG. 1 resumes at the step 103 the set of saved assignments is used as the next sequence of decisions to be made for the subsequent decisions (e.g., decisions in steps 103, 105, 119), overriding, e.g., the influence of the VSIDS scores, until the sequence is exhausted or any conflict is found through the BCP in step 113. In that event, the algorithm resumes with making decisions according to the default method such as that based on the VSIDS scores.

The modification in the step 123 can also include adding a variable to the formula, which requires extending an array holding the current assignment by a single memory address. Typically, this modification is performed as a pre-step to the process 300 of adding a clause that references the added variable, as described above with reference to FIGS. 1 and 3. The assignment stack and the clause database are otherwise unaffected, and the initial VSIDS score for an added variable is set to zero.

An exemplary system 400 that can solve planning problems by iterative repair includes a processor 402, a level-1 memory 404 (e.g., memory included in the processor 402, system RAM, etc.), and a level-2 memory 406 (e.g., hard disk, flash memory, etc). The formula representing the problem to be solved may be received in the level-1 memory 404. A set of instructions provided in the level-1 memory configure the processor 402 to solve the formula. The partial and final solutions, and elements of those solutions are generated by the processor 402 and are stored in the level-1 memory 404. The solution elements may include variable assignments, learned (e.g., conflict) clauses, and tagged clauses tracing back to the original clauses in the formula.

A modification to the formula, typically provided by an external driver, may also be received in the level-1 memory 404. Upon receiving a modification, the processor 402 analyzes the modified formula according to the set of instructions in the level-1 memory 404, and modifies (e.g., tags as invalid, removes, etc.) certain solution elements. The processor also stores into the level-2 memory 406 certain elements (e.g., learned clauses, assignments, etc.) that may have been removed from the level-1 memory 404.

The instructions in the level-1 memory 404 reconfigure the processor 402 to use certain solution elements retained in the level-1 memory 404, e.g., the solution elements that were unaffected by the formula modification. In addition, the instructions reconfigure the processor 402 to use certain solution elements stored in the level-2 memory as candidate solutions. Using these solution elements, the processor 402 efficiently finds a solution to the modified formula, in general as described above with reference to FIGS. 1-3. Although the system 400 includes one processor and two levels of memory, it should be understood that this is illustrative only, and that systems including more then one processors, each operating on a subset of instructions, and more or fewer (i.e., single) memory units are within the scope of the invention. It should also be understood that in other embodiments, the various data generated by the processor 102 may be stored in configurations other than those described above.

Figure 5:
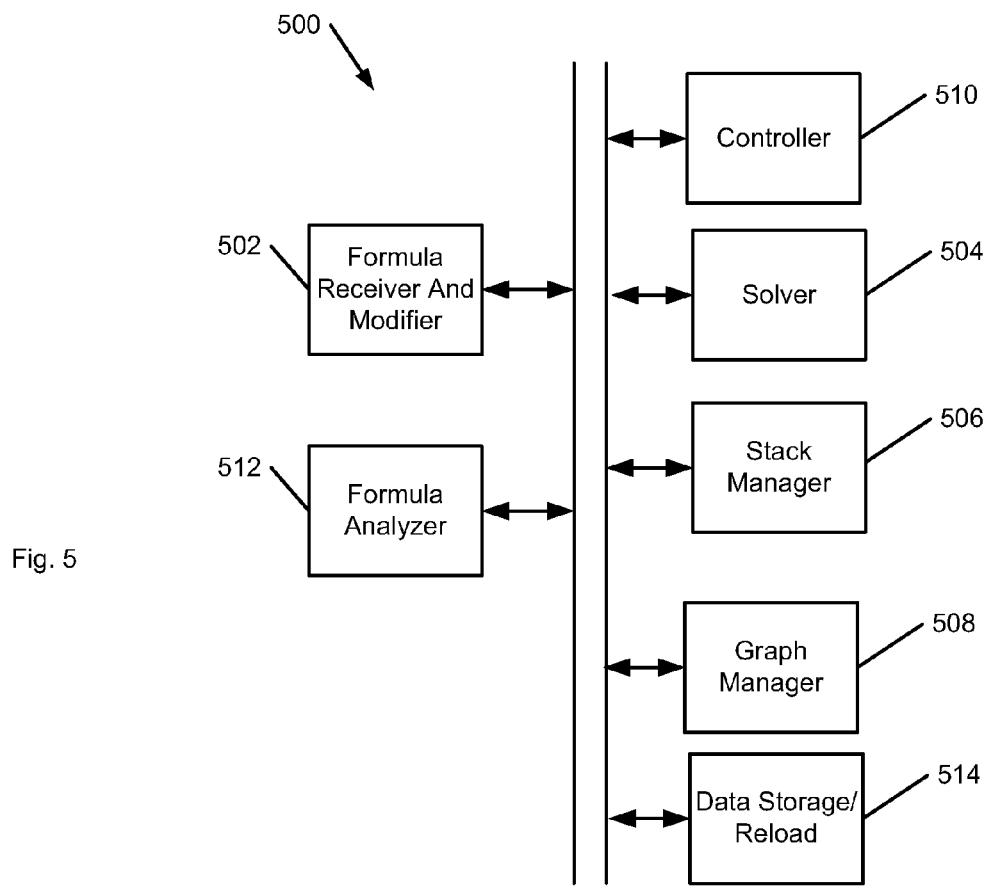
FIG. 5 schematically shows various components of a system according to a provided embodiment of the invention.

In one provided embodiment, a system of iterative repair 500, illustrated with reference to FIG. 5, includes a formula receiver/modifier module 502 for receiving a formula and its modification. The formula includes several original clauses, based on which a solver 504 generates various assignments and learned clauses. For example, the solver 504 may perform BCP and/or reverse BCP. The assignments are recorded and retrieved by a stack manager 506 and the clauses, including the original and learned clauses are recorded and retrieved by a graph manager 508. A controller 510 configures and reconfigures the solver 504 to iteratively solve the problem.

If the formula is modified, a formula analyzer 512 analyzes the partial solution generated by the solver 504 and identifies the solution elements that may have been affected by the modification. In some embodiments, the formula analyzer 512 may not be provided separately, and the solver 504 may be configured by the controller 510 to perform the required analysis. The solutions determined to be affected by the formula analyzer 512 are stored by the data storage/reload module 514. In subsequent iteration, the module 514 may reload the stored data, and the controller 510 may configure the solver 504 to use the reloaded data. The reloaded data may include assignments and clauses.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Each functional component described above (e.g., the profiler module, the miner module, the databases, the inventory module, the analyzer module, and the installer) may be implemented as stand-alone software components or as a single functional module. In some embodiments the components may set aside portions of a computer's random access memory to provide control logic that affects the interception, scanning and presentation steps described above. In such an embodiment, the program or programs may be written in any one of a number of high-level languages, such as FORTRAN, PASCAL, C, C++, C#, Java, Tcl, PERL, or BASIC. Further, the program can be written in a script, macro, or functionality embedded in commercially available software, such as EXCEL or VISUAL BASIC.

Additionally, the software may be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, computer-readable program means such as a floppy disk, a hard disk, an optical disk, a magnetic tape, a PROM, an EPROM, or CD-ROM.

Thus, it is seen that a method and an apparatus for Planning a solution to a dynamically changing problem (i.e., a problem that may change while it is being solved) are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A computer-implemented method of solving a planning problem, the method comprising:
   receiving in memory a formula comprising a plurality of original clauses, the formula representing the planning problem;
   configuring a processor to solve the formula, thereby generating a final solution to the planning problem, the final solution being based on one or more solution elements;
   receiving an environmental modification to the formula, the environmental modification comprising a modification to at least one of the plurality of original clauses that is not implied or derived from the original clauses, prior to generating the final solution;
   analyzing the modified formula, thereby identifying: (i) one or more solution elements that have been invalidated by the environmental modification, and (ii) identifying any solution elements that have not been invalidated by the environmental modification; and
   reconfiguring the processor to resolve the modified formula, such that any solution elements that have not been invalidated are reused in generating the final solution.

2. The method of claim 1, wherein generating the final solution comprises;
   learning a first clause based on an original clause belonging to the plurality of original clauses;
   associating a set of antecedent clauses with the learned first clause, the set of antecedent clauses comprising the original clause; and
   recording for the learned first clause the associated set of antecedent clauses.

3. The method of claim 2, wherein the learning step comprises reverse Boolean constraint propagation.

4. The method of claim 2, wherein the recording step comprises:
   tagging the learned first clause and each clause belonging to the associated set of antecedent clauses so as to trace back the learned first clause to the corresponding original clause, and
   saving the tagged clauses.

5. The method of claim 2, further comprising:
   learning a second clause based on the learned first clause;
   associating a set of antecedent clauses with the learned second clause, the set of antecedent clauses comprising the learned first clause and the original clause; and
   recording for the learned second clause the associated set of antecedent clauses.

6. The method of claim 2, wherein the learned first clause and all antecedent clauses belonging to the associated set of antecedent clauses comprise a plurality of literals, the method further comprising:
   assigning a value to a literal belonging to the plurality of literals;
   associating the assignment with the learned first clause.

7. The method of claim 2, further comprising outputting the learned first clause and the associated set of antecedent clauses.

8. The method of claim 1, wherein the formula comprises a first literal belonging to one of the plurality of original clauses, the generating the final solution comprising:
   assigning a value to the first literal;
   implying an assignment of a value to a second literal via Boolean constraint propagation;
   recording for the implied assignment, a set of antecedent clauses associated with a clause to which the second literal belongs.

9. The method of claim 8, further comprising outputting the implied assignment, the clause to which the second literal belongs, and the set of antecedent clauses associated with that clause.

10. The method of claim 1, wherein reconfiguring the processor comprises:
    identifying one or more learned clauses associated with a first original clause belonging to the plurality of original clauses;
    removing each of the one or more learned clauses associated with the first original clause;
    removing the first original clause; and
    retaining as solution elements, one or more learned clauses associated with a second original clause belonging to the plurality of original clauses.

11. The method of claim 10, wherein reconfiguring the processor further comprises:
    identifying assignments of values to one or more literals associated with each of the identified learned clauses;
    storing the identified assignments as candidate solution elements;
    removing the assignments; and
    retaining as solution elements, assignments of values to one or more literals associated with one or more learned clauses associated with the second original clause.

12. The method of claim 1, wherein the formula comprises a plurality of variables, and the modification comprises removing a variable belonging to the plurality of variables, the analyzing step comprising:
  identifying an original clause comprising a literal corresponding to the removed variable; and
  removing learned clauses associated with the identified original clause.

13. The method of claim 1, wherein the formula comprises a plurality of variables, and the modification comprises adding a new variable.

14. The method of claim 1, wherein the modification comprises adding a new original clause to the plurality of original clauses.

15. The method of claim 14, wherein the analyzing step comprises:
  identifying by testing whether a current variable assignment conflicts with the new original clause;
  if the assignment is conflicting, identifying a latest non-conflicting decision level resulting, in part, the current variable assignment; and
  removing assignment of value to each variable occurring at a subsequent decision level.

16. The method of claim 15, wherein
  the analyzing step further comprises saving the removed assignments; and
  reconfiguring the processor comprises testing as solution elements the saved assignments.

17. An apparatus, comprising:
  a processor; and
  a memory comprising processor executable instructions that, when executed by the processor, configure the apparatus to:
  receive in the memory a formula comprising a plurality of original clauses, the formula representing the planning problem;
  configure the processor to solve the formula, thereby generating a final solution to the planning problem, the final solution being based on one or more solution elements;
  receive an environmental modification to the formula, the environmental modification comprising a modification to at least one of the plurality of original clauses that is not implied or derived from the original clauses, prior to generating the final solution;
  analyze the modified formula, thereby identifying: (i) one or more solution elements that have been invalidated by the environmental modification, and (ii) identifying any solution elements that have not been invalidated by the environmental modification; and
  reconfigure the processor to resolve the modified formula, such that any solution elements that have not been invalidated are reused in generating the final solution.

18. The apparatus of claim 17, wherein generating the final solution comprises:
  learning a first clause based on an original clause belonging to the plurality of original clauses;
  associating a set of antecedent clauses with the learned first clause, the set of antecedent clauses comprising the original clause; and
  recording for the learned first clause the associated set of antecedent clauses.

19. The apparatus of claim 18, wherein the learning comprises reverse Boolean constraint propagation.

20. The apparatus of claim 18, wherein the recording comprises:
  tagging the learned first clause and each clause belonging to the associated set of antecedent clauses so as to trace back the learned first clause to the corresponding original clause, and
  saving the tagged clauses.

21. The apparatus of claim 18, further comprising:
  learning a second clause based on the learned first clause;
  associating a set of antecedent clauses with the learned second clause, the set of antecedent clauses comprising the learned first clause and the original clause; and
  recording for the learned second clause the associated set of antecedent clauses.

22. The apparatus of claim 18, wherein the learned first clause and all antecedent clauses belonging to the associated set of antecedent clauses comprise a plurality of literals, the method further comprising:
  assigning a value to a literal belonging to the plurality of literals;
  associating the assignment with the learned first clause.

23. The apparatus of claim 18, further comprising outputting the learned first clause and the associated set of antecedent clauses.

24. The apparatus of claim 17, wherein the formula comprises a first literal belonging to one of the plurality of original clauses, the generating the final solution comprising:
  assigning a value to the first literal;
  implying an assignment of a value to a second literal via Boolean constraint propagation;
  recording for the implied assignment, a set of antecedent clauses associated with a clause to which the second literal belongs.

25. The apparatus of claim 24, further comprising outputting the implied assignment, the clause to which the second literal belongs, and the set of antecedent clauses associated with that clause.

26. The apparatus of claim 17, wherein reconfiguring the processor comprises:
  identifying one or more learned clauses associated with a first original clause belonging to the plurality of original clauses;
  removing each of the one or more learned clauses associated with the first original clause;
  removing the first original clause; and
  retaining as solution elements, one or more learned clauses associated with a second original clause belonging to the plurality of original clauses.

27. The apparatus of claim 26, wherein reconfiguring the processor further comprises:
  identifying assignments of values to one or more literals associated with each of the identified learned clauses;
  storing the identified assignments as candidate solution elements;
  removing the assignments; and
  retaining as solution elements, assignments of values to one or more literals associated with one or more learned clauses associated with the second original clause.

28. The apparatus of claim 17, wherein the formula comprises a plurality of variables, and the modification comprises removing a variable belonging to the plurality of variables, the analyzing comprising:
  identifying an original clause comprising a literal corresponding to the removed variable; and
  removing learned clauses associated with the identified original clause.

29. The apparatus of claim 17, wherein the formula comprises a plurality of variables, and the modification comprises adding a new variable.

30. The apparatus of claim 17, wherein the modification comprises adding a new original clause to the plurality of original clauses.

31. The apparatus of claim 30, wherein the analyzing comprises:
identifying by testing whether a current variable assignment conflicts with the new original clause;
if the assignment is conflicting, identifying a latest non-conflicting decision level resulting, in part, the current variable assignment; and
removing assignment of value to each variable occurring at a subsequent decision level.

32. The apparatus of claim 31, wherein
the analyzing further comprises saving the removed assignments; and
reconfiguring the processor comprises testing as solution elements the saved assignments.

33. An article of manufacture, comprising a non-transitory machine-readable medium storing instructions that, when executed by the machine, configure the machine to:
receive in the memory a formula comprising a plurality of original clauses, the formula representing the planning problem;
configure the machine to solve the formula, thereby generating a final solution to the planning problem, the final solution being based on one or more solution elements;
receive an environmental modification to the formula, the environmental modification comprising a modification to at least one of the plurality of original clauses that is not implied or derived from the original clauses, prior to generating the final solution;
analyze the modified formula, thereby identifying: (i) one or more solution elements that have been invalidated by the environmental modification, and (ii) identifying any solution elements that have not been invalidated by the environmental modification; and
reconfigure the machine to resolve the modified formula, such that any solution elements that have not been invalidated are reused in generating the final solution.

34. The article of claim 33, wherein generating the final solution comprises;
learning a first clause based on an original clause belonging to the plurality of original clauses;
associating a set of antecedent clauses with the learned first clause, the set of antecedent clauses comprising the original clause; and
recording for the learned first clause the associated set of antecedent clauses.

35. The article of claim 34, wherein the learning comprises reverse Boolean constraint propagation.

36. The article of claim 34, wherein the recording comprises:
tagging the learned first clause and each clause belonging to the associated set of antecedent clauses so as to trace back the learned first clause to the corresponding original clause, and
saving the tagged clauses.

37. The article of claim 34, further comprising:
learning a second clause based on the learned first clause;
associating a set of antecedent clauses with the learned second clause, the set of antecedent clauses comprising the learned first clause and the original clause; and
recording for the learned second clause the associated set of antecedent clauses.

38. The article of claim 34, wherein the learned first clause and all antecedent clauses belonging to the associated set of antecedent clauses comprise a plurality of literals, the method further comprising:
assigning a value to a literal belonging to the plurality of literals;
associating the assignment with the learned first clause.

39. The article of claim 34, further comprising outputting the learned first clause and the associated set of antecedent clauses.

40. The article of claim 33, wherein the formula comprises a first literal belonging to one of the plurality of original clauses, the generating the final solution comprising:
assigning a value to the first literal;
implying an assignment of a value to a second literal via Boolean constraint propagation;
recording for the implied assignment, a set of antecedent clauses associated with a clause to which the second literal belongs.

41. The article of claim 40, further comprising outputting the implied assignment, the clause to which the second literal belongs, and the set of antecedent clauses associated with that clause.

42. The article of claim 33, wherein reconfiguring the machine comprises:
identifying one or more learned clauses associated with a first original clause belonging to the plurality of original clauses;
removing each of the one or more learned clauses associated with the first original clause;
removing the first original clause; and
retaining as solution elements, one or more learned clauses associated with a second original clause belonging to the plurality of original clauses.

43. The article of claim 42, wherein reconfiguring the machine further comprises:
identifying assignments of values to one or more literals associated with each of the identified learned clauses;
storing the identified assignments as candidate solution elements;
removing the assignments; and
retaining as solution elements, assignments of values to one or more literals associated with one or more learned clauses associated with the second original clause.

44. The article of claim 33, wherein the formula comprises a plurality of variables, and the modification comprises removing a variable belonging to the plurality of variables, the analyzing comprising:
identifying an original clause comprising a literal corresponding to the removed variable; and
removing learned clauses associated with the identified original clause.

45. The article of claim 33, wherein the formula comprises a plurality of variables, and the modification comprises adding a new variable.

46. The article of claim 33, wherein the modification comprises adding a new original clause to the plurality of original clauses.

47. The article of claim 46, wherein the analyzing comprises:
identifying by testing whether a current variable assignment conflicts with the new original clause;
if the assignment is conflicting, identifying a latest non-conflicting decision level resulting, in part, the current variable assignment; and
removing assignment of value to each variable occurring at a subsequent decision level.

48. The article of claim 47, wherein
the analyzing further comprises saving the removed assignments; and
reconfiguring the machine comprises testing as solution elements the saved assignments.

\* \* \* \* \*